UNITED STATES PATENT OFFICE.

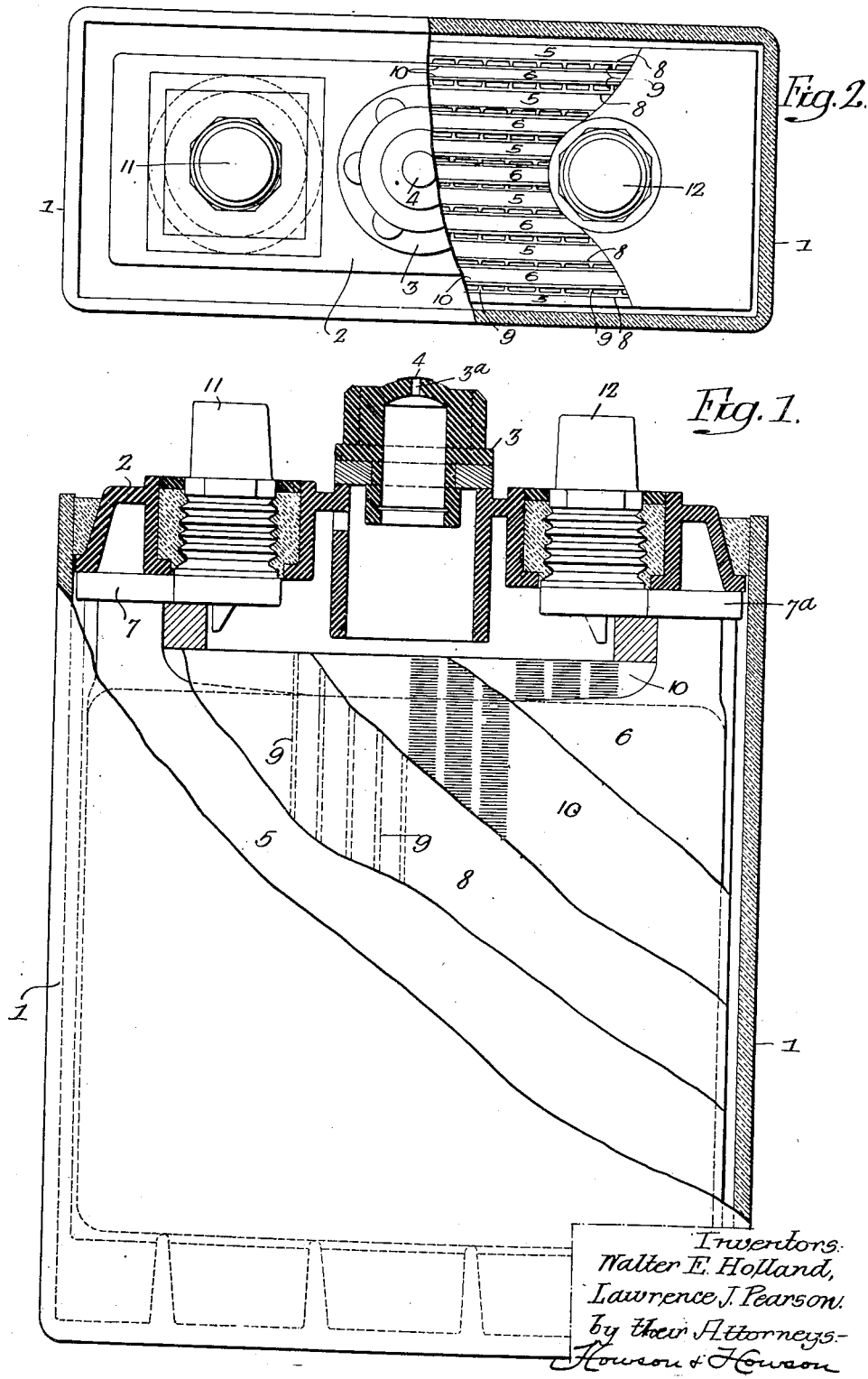

WALTER E. HOLLAND, OF PHILADELPHIA, AND LAWRENCE J. PEARSON, OF WYNCOTE, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

STORAGE BATTERY AND METHOD OF PREPARING SAME.

1,329,181.  Specification of Letters Patent.  Patented Jan. 27, 1920.

Application filed September 5, 1919. Serial No. 321,875.

*To all whom it may concern:*

Be it known that we, WALTER E. HOLLAND and LAWRENCE J. PEARSON, citizens of the United States, residing in Philadelphia and Wyncote, respectively, in the State of Pennsylvania, have invented Storage Batteries and Methods of Preparing Same, of which the following is a specification.

In the manufacture and handling of a storage battery prior to its being placed in service it is desirable that it shall be completely assembled in an undeveloped condition without electrolyte in order that it may be carried in stock over long periods of time without deterioration and one object of our invention therefore, is to provide a completely assembled storage battery whose elements shall have a novel constitution or be in a novel condition which shall permit of its handling and storage for indefinite and prolonged periods of time without deterioration of or injury to its elements and more particularly the wood separators and to the positive plates.

It is further desired to provide a novel method of preparing or assembling the parts of a storage battery with a view to maintaining said parts and particularly the positive plates and wood separators in such condition that while the battery shall be ready for use upon the introduction of the electrolyte, said plates shall be kept from hydrating and the separators shall be prevented from drying out for a prolonged period prior to such use.

These objects and other advantageous ends we attain as hereinafter set forth, reference being had to the accompanying drawings, in which, Figure 1 is an elevation partly in section illustrating a well known form of storage battery to which our invention is particularly applicable; and Fig. 2 is a plan partly in section, further illustrating the invention.

In the above drawings 1 represents a suitable jar or container having a liquid tight or sealed cover 2 provided with sealed openings through which pass the terminal posts or conductors 11 and 12 of the battery and also including an opening for a filler cap 3 through which is a small passage $3^a$ closed by a seal 4 which preferably consists of a small disk of shellacked paper. Within the cell are negative plates 5 alternated with positive plates 6 and these two sets of plates are respectively burned to lead alloy straps indicated at 7 and $7^a$. Between each positive plate and the adjacent negative plates are mounted vertically ribbed wooden separator plates 8 each having its flat face in engagement with the flat face of a negative plate and its vertical ribs 9 either in direct engagement with the adjacent face of a positive plate or, in one form of battery, resting upon the flat face of a perforated or slotted sheet rubber separator 10, as in the case illustrated.

The lead alloy straps 7 and $7^a$ are burnt or otherwise suitably connected to the two terminal posts of the cell. In accordance with our invention, in manufacturing the battery the positive and negative plates 5 and 6 are made in any desired manner and are burned to the lead alloy straps 7 and $7^a$ to form positive and negative groups of the size desired. These groups are assembled and insulated with the wood and rubber separators 8 and 10, or with wood separators only, in the usual manner with the exception that the negative plates are soaked or moistened with water just previous to their assembly, while the positive plates are kept dry.

The wooden separators 8—9 are assembled in the wet condition. The assembled elements 5, 6, 8 and 10 are then placed in the jar 1, the cover 2 is sealed in position and is closed tightly by inserting the sealed vent plug 3. After the cells constituting a complete battery are assembled and sealed as above described, the connectors and terminals are burned on, thus completing the battery which is ready for shipment or storage.

In utilizing the above method of assembly and in the battery thus made it will be noted that the wooden separators will be kept wet for a long period of time by the wet negative plates which as described are in intimate contact with the flat sides or faces of said separators. Said plates instead of absorbing the water from the separators as they would if dry, serve as reservoirs or sources of supply which deliver water to the separators maintaining them in a wet or moist condition as is required.

If the battery includes rubber separators 10 as shown, there can obviously be no great absorption of water from the wooden separators by the dry positive plates. Even if the rubber separators be omitted but little moisture is absorbed from the wood by the dry positive plates, since only the narrow ribs 9 of the wood separators are in contact with said plates and said ribs constitute a relatively small part of the total area of such separator. Moreover it is the thin web or body of the wood between the ribs of the separators 8 which it is desirable to keep from drying out and shrinking, and obviously the moisture in these thin webs has relatively long paths to travel in order to reach the positive plate by way of the thicker ribs.

Another important and valuable feature of the invention resides in the fact that the positive plates are kept practically dry so that any objectionable formation of lead hydrate is avoided. There is thus no serious weakening of the grid members due to hydration or other action of water on them and the formation of "moss" such as might cause short-circuiting of the cell around the edges of the separators is prevented. Again it is noted that, by reason of the substantially dry condition of the positive plates, they are not liable to be cracked or otherwise injured from the freezing which might occur when they are shipped wet as heretofore done, it being noted that the active material of the negative plates does not tend to crack or chip off when wet or frozen and has no tendency to form hydrate of lead.

As compared with any method in which the separators and plates are assembled into batteries in the dry condition, our method has the advantage that the separators are maintained in a porous, expanded condition such that no soaking is required on putting a battery into service and the battery is ready for charging and use immediately after filling. There is also the incidental but not unimportant advantage that enough moisture is present to produce voltage at the cell terminals so that cells may be tested for polarity and short-circuit before shipment.

We claim:

1. The method of making a storage battery which consists in assembling with a container a series of wet negative plates, a series of dry positive plates, a series of water-containing wooden separators between said plates respectively; and thereafter sealing said cell.

2. The method of assembling a storage battery which consists in placing within a cell a series of wet negative plates, a series of dry positive plates and a series of wet ribbed separators respectively placed between the positive and negative plates with their ribs engaging the positive plates and their flat faces engaging the negative plates; and thereafter sealing the cell.

3. A storage battery consisting of a container; a series of wet negative plates; a series of substantially dry positive plates; with water-containing separators mounted between the positive and negative plates respectively.

4. A storage battery consisting of a sealed container; a series of wet negative plates; a series of substantially dry positive plates; a series of wet wooden separators mounted between the positive and negative plates respectively.

5. A storage battery consisting of a container; a series of wet negative plates; a series of substantially dry positive plates; and a series of ribbed wooden separators respectively having flat faces in engagement with the negative plates and their ribbed faces directed toward the faces of the adjacent positive plates.

6. A storage battery consisting of a container; a series of wet negative plates; a series of substantially dry positive plates; wet ribbed wooden separators mounted with their flat faces respectively in engagement with the negative plates; and rubber separators interposed between the separator ribs and the faces of the positive plates.

7. The combination of a sealed container; with storage battery elements therein consisting of wet negative plates, a series of substantially dry positive plates, and water containing separators mounted between the positive and negative plates respectively.

In witness whereof we affix our signatures.

WALTER E. HOLLAND.
LAWRENCE J. PEARSON.